UNITED STATES PATENT OFFICE 2,119,302

METHOD OF MANUFACTURING A NOURISHMENT CONSISTING MAINLY OF GLYCOPROTEIN

Shinjiro Tanaka, Hongo-ku, Tokyo, Japan, assignor of one-half to Jirokichi Suzuki, Tokyo, Japan No Drawing. Application March 30, 1937, Serial No. 133,905

2 Claims. (Cl. 99—17)

This invention relates to a method of manufacturing a nourishment consisting mainly of glycoprotein, which consists in diluting crushed root of Dioscorea japonica with a water solution of calcium chloride, magnesium chloride and calcium hydro-oxide, separating the solid residue from it by filtration, concentrating the juice by vaporization after the addition of sodium glycerophosphate and then neutralizing the same with tartaric acid. The object thereof is to produce a nourishment economically which can stand preservation and has great nutritive value.

Glycoprotein which is a composite albuminous matter, although it is necessary for the nourishment of the human body, has the defect of easily rotting or being hydrolyzed and accordingly being unable to stand preservation. According to the present invention, the Dioscorea japonica ("Jin-enjo", "Iye-yamaimo", "Tsukuneimo", etc.) crushed in a pasty form is diluted with a water solution of calcium chloride, magnesium chloride and calcium hydro-oxide and the solid residue is removed therefrom by filtration. Next, sodium glycero-phosphate is added to the juice as a stabilizing agent, and then after concentrated under reduced pressure the mixture is neutralized with tartaric acid. Thus, it is possible to produce a nourishment free from the above defect. In this invention, sodium glycero-phosphate prevents the hydrolysis of the glycoprotein and at the same time keeps it from rotting. Moreover, it in cooperation with calcium hydro-oxide prevents the coagulation of glycoprotein during heat-treatment, while calcium chloride and magnesium chloride reduce the viscosity of glycoprotein to facilitate its filtration and other treatments and also increase its nutritive value.

The following is an example of performing the present invention:—

Dilute the root of Dioscorea japonica crushed in a pasty form by a crusher, with a mixed solution consisting of 2.2% of calcium chloride, 5.8% of sodium chloride, 6.6% of magnesium chloride, 5.4% of calcium hydroxide and 80% of water and filter it with a suction filtering machine. Then, dissolve sodium glycero phosphate of the quantity equivalent to 3% of the solid matter in the filtrate and concentrate the solution by vaporization under reduced pressure. Lastly, by pouring tartaric acid solution into the above while stirring it, it has its alkalinity neutralized.

I claim:—

1. The process of manufacturing a food which comprises crushing the root of Dioscorea japonica, mixing the resulting product with an aqueous solution containing calcium chloride, magnesium chloride, and calcium hydroxide, filtering the solution, adding sodium glycero-phosphate to the filtrate, concentrating this product and neutralizing it with tartaric acid.

2. The process of preparing nourishment which comprises crushing the root of Dioscorea japonica to a pasty form, adding an aqueous solution of calcium and magnesium chlorides thereto to reduce its viscosity, adding calcium hydroxide to render it alkaline and prevent its coagulation by heat, filtering the so obtained solution, adding sodium glycero-phosphate as a stabilizing agent, concentrating the product and adding tartaric acid to the concentrate to neutralize it.

SHINJIRO TANAKA.